United States Patent [19]

Sadjina et al.

[11] Patent Number: 5,713,983
[45] Date of Patent: Feb. 3, 1998

[54] METHOD FOR THE DISPOSAL/UTILIZATION OF GAS CYLINDERS CONTAINING FILLERS

[75] Inventors: Heinz Sadjina, Pullach; Uwe Butschek, Munich, both of Germany

[73] Assignee: Linde Aktiengesellschaft, Wiesbaden, Germany

[21] Appl. No.: 605,024

[22] PCT Filed: Feb. 14, 1994

[86] PCT No.: PCT/EP94/00415

§ 371 Date: Feb. 26, 1996

§ 102(e) Date: Feb. 26, 1996

[87] PCT Pub. No.: WO95/06139

PCT Pub. Date: Mar. 2, 1995

[30] Foreign Application Priority Data

Aug. 25, 1993 [DE] Germany .......................... 43 28 610.0
Oct. 27, 1993 [DE] Germany .......................... 43 36 707.0

[51] Int. Cl.⁶ .............................. C21B 5/00; C21B 11/02; C21B 11/06

[52] U.S. Cl. .................................. 75/472; 75/573; 75/581

[58] Field of Search ........................ 75/581, 472, 573

[56] References Cited

U.S. PATENT DOCUMENTS 5,066,326  11/1991  Agarwal et al. .......................... 75/581
5,248,100   9/1993  Arakawa ................................. 241/34

FOREIGN PATENT DOCUMENTS 522331     10/1992  European Pat. Off. ............... 75/581
0 522 331   1/1993  European Pat. Off. .
41 42 401   6/1993  Germany .

*Primary Examiner*—Melvyn Andrews
*Attorney, Agent, or Firm*—Evenson McKeown Edwards & Lenahan, PLLC

[57] ABSTRACT

A method is provided for the disposal and utilization of sorted-out gas cylinders filled with fillers. The method is characterized in that the gas cylinders, together with the fillers contained therein, are supplied as charge in the degasified, opened condition as a whole or comminuted into large pieces, to an iron melting furnace, in particular a cupola furnace, a blast furnace or a rotary drum type furnace.

25 Claims, No Drawings

METHOD FOR THE DISPOSAL/ UTILIZATION OF GAS CYLINDERS CONTAINING FILLERS

BACKGROUND AND SUMMARY OF THE INVENTION

The invention relates to a method for the disposal and utilization, i.e., re-use, of gas cylinders containing fillers.

Gas cylinders containing fillers are used for storing unstable fuel gases such as acetylene, propylene and the like. A filler can consist of a dumped, pebble-like, possibly baked material or of a monolithic block of a kind of building material, where these fillers each include a network of cavities containing a solvent such as acetone for the actual absorption and storage of gas. In practical usage, gas cylinders are not only sorted out because of their old age, but again and again there are detected damages in the fillers of such gas cylinders, for instance unfavorably large gaps or cracks in the same, so that these cylinders must be prematurely withdrawn from service. On the whole, a large number of cylinders must therefore constantly be put to an appropriate disposal. Because of impurities in the fillers (e.g. caused by the solvent), but above all due to the fact that for strength reasons the monolithic fillers contain chemically extremely stable fibers such as asbestos fibers or special glass fibers, these gas cylinders constitute goods requiring a specific disposal. Up to now, gas cylinders that had been sorted out were either subject to a final storage as a whole, or in a complex process—as the steel jacket and filler can often not easily be separated—the cylinders were split up into their components. The steel jacket was then further processed, and merely the filler was disposed of in an appropriate manner.

These disposal methods are disadvantageous on the one hand for reasons of an economic handling of raw materials and on the other hand for reasons of expenditure, so that the resulting object underlying the invention consisted in improving this situation in the disposal of corresponding gas cylinders.

In accordance with the invention, this object is achieved in that the gas cylinders together with the filler contained therein are supplied as charge in the opened and relieved condition to an iron smelting furnace, in particular a cupola furnace, blast furnace or rotary drum type furnace. The gas cylinders are supplied as a whole, i.e., in one piece, or merely comminuted or broken-up into larger pieces.

The invention is based on the idea that in particular the combination of materials-existing in the form of gas cylinders containing fillers might well be suited for use in slag-forming iron melting furnaces. This assumption is on the one hand justified in that the gas cylinders contain iron material (namely the steel jacket) that can probably easily be converted into the corresponding product iron (cast iron, raw iron, certain steels), and on the other hand that the fillers contained therein in all probability represent a suitable starting material for the formation of slag during the corresponding melting processes. As was discovered by the applicants, these assumptions have proved to be true, where in addition the fibrous materials possibly contained in the fillers, in particular the asbestos fibers, are advantageously converted into slag and bound therein (the fibers are probably molten and solidify in conjunction with other slag components). Thus, an extremely advantageous disposal and also utilization of the gas cylinders and comparable gas accumulators is ensured.

A particularly advantageous embodiment of the invention is obtained in conjunction with cupola furnaces, and here the gas cylinders are in any case first comminuted or broken-apart into larger pieces. These pieces are then provided as charge and are introduced as such in the cupola furnace, where they extremely advantageously act as both iron-forming and slag-forming material.

In the larger-dimension blast furnaces and rotary drum type furnaces (as to the latter see for instance German Patent document DE-OS 41 42 401), however, whole uncomminuted gas cylinders can also be introduced. The whole uncomminuted gas cylinders must, however, be in the opened, degasified and possibly tapped condition.

In accordance with the invention, the gas cylinders are, however, advantageously comminuted into large pieces with a maximum outer dimension of 50 cm, preferably not more than 30 cm. On the one hand, this provides goods that can be easily handled and, on the other hand, can be easily introduced and molten in shaft furnaces, in particular in cupola furnaces producing cast iron, as well as in rotary drum type furnaces. Furthermore, the percentage of gas cylinders or gas cylinder pieces in the iron charge, i.e. in the charge consisting of iron material, can be up to 40% by weight. Preferably, about 5 to 20% by weight of the otherwise usual iron charge are filled with the preferably comminuted cylinders, which were proposed in accordance with the invention, and are introduced in the respective furnace.

Since the pieces introduced in accordance with the invention each include parts of the gas cylinder jacket, and the same consists of steel containing comparatively little carbon (as compared to cast iron), the invention is executed in an advantageous embodiment such that simultaneously with the addition of gas cylinder pieces, carbon donors are added. In particular, the pneumatic supply of appropriate dust-like carbonaceous materials is particularly advantageous for obtaining higher carbon contents in the resulting base iron (see for instance German Patent document DE-OS 38 11 166).

Frequently, the respective gas cylinders are specifically degasified or temporarily stored in the opened condition, after they have been sorted out, so that the same are then—or possibly after having been comminuted, for instance by being sawn transverse to the longitudinal direction—ready for use in accordance with the invention. Comminuting should always preferably be performed on the spot near the melting furnace and possibly separate from the surroundings, so as to prevent a large-scale distribution of fibrous material from the fillers into the surroundings. Corresponding measures should possibly be taken during the transport of already comminuted gas cylinders, for instance a corresponding packaging or sealing of the parts, in order to prevent this from happening. In a particularly economical embodiment of the invention, the respective gas cylinders are, however, neither specifically degasified nor separately drained of the possibly still present solvent (the corresponding means do not disturb the operation of the cupola furnace), but rather the gas cylinders are brought to the processing furnace as they are. At the processing furnace, the gas cylinders are advantageously comminuted—if at all—through the use of guillotine shears at a separate place, and are then introduced in the respective furnace.

DETAILED DESCRIPTION OF THE PREFERRED EMBODIMENTS

In the following, the invention will be explained in detail with reference to an embodiment.

In a medium-sized cupola furnace plant, the usual operation charges introduced into the plant are, for instance, about 1200 kg. In detail, the usual operation charges consist of about 1000 kg iron material (e.g. scrap iron, cast iron scrap, etc.), 100–110 kg charge coke, and 40–50 kg limestone as well as some low-percentage aggregates. In the case of a conventional operation, slag-forming material, for instance pebbles, is likewise added if necessary in an amount of up to 50 kg.

In accordance with the invention, however, there is for instance compiled and regularly supplied a charge which merely contains about 900 kg of the usual iron material, but in addition contains 50 to 150 kg of gas cylinder segments measuring 20–30 cm with a filler containing asbestos fibers. Moreover, the same charge percentages as above should be provided, but in general the additional slag-forming material can normally be omitted.

This charge, as compared to the usual charge, does not lead to any major changes in the operation of the cupola furnace and in the iron analysis. A cast iron of unchanged quality is obtained, and with the fillers a material is introduced in the cupola furnace which has a favorable influence on the slag formation. There is obtained a slag with the usual composition and viscosity, which—as far as could be found out so far—contains no fibrous material. Asbestos or also glass fibers are therefore molten in the course of the melting process in the cupola furnace (see for instance German Patent document DE-A-41 22 381) and finally solidify together with the other known admixtures to form a slag. As usual, the slag can for instance be used as basic road building material. Even with dumped fillers, basically the same results are achieved, and the problem of the spreading of the fibers does in principle not exist here, whereas the other, commonly used materials exhibit the same favorable behavior in the cupola furnace process as those of the monolithic fillers.

The proposal in accordance with the invention thus provides a substantial improvement concerning the disposal of gas cylinders containing fillers, which has advantages as regards the utilization of material and also as regards the expenditure, the environmental protection and the occupational safety.

What is claimed is:

1. A method of disposing of gas cylinders formed at least in part of iron and filled with filler material capable of forming slag in an iron melting furnace, said method comprising:

degassing the gas cylinders, supplying the gas cylinders to an iron melting furnace, operating the iron melting furnace to heat the gas cylinders and transform them into molten n products and slag products, with said slag products being formed at least in part by the filler material, and separating the molten iron products and slag products downstream of the iron melting furnace.

2. The method according to claim 1, wherein said iron melting furnace is one of a cupola furnace, a blast furnace, and a rotary drum furnace.

3. The method according to claim 1, comprising comminuting the gas cylinders together with their filler material prior to said supplying of the gas cylinders to the iron melting furnace.

4. The method according to claim 3, wherein said iron melting furnace is a cupola furnace.

5. The method according to claim 3, wherein said comminuting is carried out so that the largest pieces have a maximum outer dimension of 50 cm.

6. The method according to claim 4, wherein said comminuting is carried out so that the largest pieces have a maximum outer dimension of 50 cm.

7. The method according to claim 3, wherein said comminuting is carried out so that the largest pieces have a maximum outer dimension of not more than 30 cm.

8. The method according to claim 4, wherein said comminuting is carried out so that the largest pieces have a maximum outer dimension of not more than 30 cm.

9. The method according to claim 1, wherein said supplying the gas cylinders to an iron melting furnace includes supplying the gas cylinders as only part of an iron charge to the iron melting furnace.

10. The method according to claim 9, wherein the gas cylinders comprise up to 40% by weight of the iron charge.

11. The method according to claim 3, wherein said supplying the gas cylinders to an iron melting furnace includes supplying the gas cylinders as only part of an iron charge to the iron melting furnace.

12. The method according to claim 11, wherein the gas cylinders comprise up to 40% by weight of the iron charge.

13. The method according to claim 12, wherein said comminuting is carried out so that the largest pieces have a maximum outer dimension of 50 cm.

14. The method according to claim 12, wherein said comminuting is carried out so that the largest pieces have a maximum outer dimension of not more than 30 cm.

15. The method according to claim 9, wherein the gas cylinders comprise 5% to 20% by weight of the iron charge.

16. The method according to claim 3, wherein the gas cylinders comprise 5% to 20% by weight of the iron charge.

17. The method according to claim 1, further comprising the step of adding carbon donors simultaneously with the supplying of the gas cylinders to the iron melting furnace.

18. The method according to claim 17, wherein the step of adding the carbon donors further comprises the step of pneumatically supplying appropriate dust-like, carbonaceous material.

19. The method according to claim 1, further comprising the step of providing additional openings in the gas cylinder prior to said supplying of the gas cylinders to an iron melting furnace.

20. The method according to claim 19, comprising comminuting the gas cylinders together with their filler material prior to said supplying of the gas cylinders to the iron melting furnace.

21. The method according to claim 1, wherein said filler material contains chemically stable fibers.

22. The method according to claim 21, wherein said chemically stable fibers include glass fibers.

23. The method according to claim 21, wherein said chemically stable fibers include asbestos fibers.

24. The method according to claim 22, comprising comminuting the gas cylinders together with their filler material prior to said supplying of the gas cylinders to the iron melting furnace.

25. The method according to claim 23, comprising comminuting the gas cylinders together with their filler material prior to said supplying of the gas cylinders to the iron melting furnace.

* * * * *